(12) United States Patent
Liu et al.

(10) Patent No.: US 10,324,649 B2
(45) Date of Patent: Jun. 18, 2019

(54) METHOD FOR PARTITIONING MEMORY AREA OF NON-VOLATILE MEMORY

(71) Applicants: Inventec (Pudong) Technology Corporation, Shanghai (CN); INVENTEC CORPORATION, Taipei (TW)

(72) Inventors: Ming-Yuan Liu, Taipei (TW); Cheng-Yu Wu, Taipei (TW); Chian-Ting Chen, Taipei (TW); Huan-Chung Hsu, Taipei (TW); An-Chi Cheng, Taipei (TW); Chao-Chieh Chen, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 15/849,607

(22) Filed: Dec. 20, 2017

(65) Prior Publication Data
US 2019/0034110 A1    Jan. 31, 2019

(30) Foreign Application Priority Data
Jul. 26, 2017 (CN) .......................... 2017 1 0618871

(51) Int. Cl.
| | |
|---|---|
| *G06F 3/06* | (2006.01) |
| *G06F 12/02* | (2006.01) |
| *G06F 13/16* | (2006.01) |
| *G06F 12/0846* | (2016.01) |
| *G11C 11/56* | (2006.01) |
| *G06F 21/78* | (2013.01) |

(Continued)

(52) U.S. Cl.
CPC .......... *G06F 3/0644* (2013.01); *G06F 3/0605* (2013.01); *G06F 3/0632* (2013.01); *G06F 3/0647* (2013.01); *G06F 3/0679* (2013.01); *G06F 3/0688* (2013.01); *G06F 12/0246* (2013.01); *G06F 12/0848* (2013.01); *G06F 13/1694* (2013.01); *G06F 21/78* (2013.01); *G06F 21/79* (2013.01); *G06F 21/88* (2013.01); *G11C 11/5628* (2013.01); *G06F 21/80* (2013.01); *G06F 2212/1016* (2013.01); *G06F 2212/7208* (2013.01)

(58) Field of Classification Search
CPC ..................................................... G06F 3/0644
See application file for complete search history.

(56) References Cited

U.S. PATENT DOCUMENTS

| | | | |
|---|---|---|---|
| 5,675,769 A * | 10/1997 | Ruff ...................... | G06F 3/0607 711/112 |
| 6,330,653 B1 * | 12/2001 | Murray .................. | G06F 3/0605 707/E17.01 |

(Continued)

*Primary Examiner* — Khoa D Doan
(74) *Attorney, Agent, or Firm* — CKC & Partners Co., LLC

(57) ABSTRACT

A method for partitioning magnetic area of non-volatile memory includes following steps. Original data stored in a storage space of a removable memory device is totally transferred to a backup space which is located in a place other than the removable memory device. The storage space of the removable memory device is partitioned. The original data stored in the backup space is totally transferred back to the storage space of the removable memory device after the storage space of the removable memory device being partitioned is finished.

7 Claims, 6 Drawing Sheets

(51) Int. Cl.
*G06F 21/79* (2013.01)
*G06F 21/88* (2013.01)
*G06F 21/80* (2013.01)

(56) References Cited

U.S. PATENT DOCUMENTS

| | | | | |
|---|---|---|---|---|
| 7,370,166 B1* | 5/2008 | Ramesh | | G06F 12/1433 |
| | | | | 711/163 |
| 9,710,256 B2* | 7/2017 | Deng | | G06F 8/654 |
| 2002/0129217 A1* | 9/2002 | Nichols | | G06F 3/0608 |
| | | | | 711/173 |
| 2007/0180167 A1* | 8/2007 | Tan | | G06F 13/4081 |
| | | | | 710/74 |
| 2008/0082725 A1* | 4/2008 | Elhamias | | G06F 12/0246 |
| | | | | 711/103 |
| 2008/0250219 A1* | 10/2008 | Shimada | | G06F 3/0607 |
| | | | | 711/173 |
| 2009/0125643 A1* | 5/2009 | Prevost | | G06F 3/0623 |
| | | | | 710/10 |
| 2009/0210464 A1* | 8/2009 | Chiang-Lin | | G06F 12/023 |
| 2009/0254715 A1* | 10/2009 | Jeong | | G06F 12/0292 |
| | | | | 711/153 |
| 2009/0282195 A1* | 11/2009 | Wang | | G06F 3/0607 |
| | | | | 711/115 |
| 2009/0307439 A1* | 12/2009 | Jacobs | | G06F 11/0712 |
| | | | | 711/153 |
| 2009/0307455 A1* | 12/2009 | Pliss | | G06F 12/023 |
| | | | | 711/170 |
| 2010/0095082 A1* | 4/2010 | Hull | | G06F 21/78 |
| | | | | 711/171 |
| 2010/0131695 A1* | 5/2010 | Gyl | | G06F 12/0246 |
| | | | | 711/103 |
| 2010/0185808 A1* | 7/2010 | Yu | | G06F 13/1684 |
| | | | | 711/103 |
| 2010/0229004 A1* | 9/2010 | Asnaashari | | G06F 12/1408 |
| | | | | 713/193 |
| 2011/0138148 A1* | 6/2011 | Friedman | | G06F 3/0613 |
| | | | | 711/173 |
| 2011/0161551 A1* | 6/2011 | Khosravi | | G06F 21/80 |
| | | | | 711/103 |
| 2011/0231638 A1* | 9/2011 | Castillo | | G06F 8/61 |
| | | | | 713/2 |
| 2012/0198133 A1* | 8/2012 | Chou | | G06F 12/0623 |
| | | | | 711/103 |
| 2012/0221770 A1* | 8/2012 | Sakurai | | G06F 12/1416 |
| | | | | 711/103 |
| 2013/0019058 A1* | 1/2013 | Caraccio | | G06F 12/0223 |
| | | | | 711/103 |
| 2013/0042237 A1* | 2/2013 | Cardona | | G06F 12/0284 |
| | | | | 718/1 |
| 2013/0054611 A1* | 2/2013 | Lee | | G06F 17/30194 |
| | | | | 707/741 |
| 2013/0097387 A1* | 4/2013 | Sanchez Martin | | |
| | | | | G06F 12/0862 |
| | | | | 711/129 |
| 2013/0097400 A1* | 4/2013 | Shitomi | | G06F 3/0604 |
| | | | | 711/165 |
| 2013/0332446 A1* | 12/2013 | Zhou | | G06F 17/30584 |
| | | | | 707/713 |
| 2014/0108710 A1* | 4/2014 | Chen | | G06F 12/0638 |
| | | | | 711/103 |
| 2014/0189209 A1* | 7/2014 | Sinclair | | G06F 12/0246 |
| | | | | 711/103 |
| 2015/0153766 A1* | 6/2015 | Afrooze | | H04N 5/772 |
| | | | | 711/115 |
| 2015/0277897 A1* | 10/2015 | Deng | | G06F 8/654 |
| | | | | 717/169 |
| 2016/0269537 A1* | 9/2016 | Gandhi | | H04M 1/72563 |
| 2017/0147247 A1* | 5/2017 | Chen | | G06F 3/06 |

* cited by examiner

METHOD FOR PARTITIONING MEMORY AREA OF NON-VOLATILE MEMORY

RELATED APPLICATIONS

This application claims priority to China Application Serial Number 201710618871.3, filed Jul. 26, 2017, which is herein incorporated by reference.

BACKGROUND

Field of Disclosure

The present disclosure relates to a method for partitioning memory area. More particularly, the present disclosure relates to a method for partitioning a memory area of a non-volatile memory.

Description of Related Art

In recent years, because the Universal Serial Bus (USB) removable memory has met the requirements of storing and carrying data, USB removable memory has been increasingly become a convenient tool for data access. In order to avoid all files in a USB removable memory from being examined without permission if the USB removable memory is borrowed or loaned to a user who is not the owner of the USB removable memory, a confidential file can be placed in an encrypted area in the USB removable memory so as to decrease the possibilities of the confidential file being stolen.

However, if an encrypted area is created on a USB removable memory, all files which are encrypted in the USB removable memory are lost at the same time, which will decrease the usage intention of the user.

Given above, how to develop a solution for effectively overcoming the aforementioned inconvenience and shortages is a serious concern for many industries.

SUMMARY

One embodiment of the disclosure is to provide a method for partitioning a magnetic area of a non-volatile memory includes following steps. Original data stored in a storage space of a removable memory device is totally transferred to a backup space which is located in a place other than the removable memory device. The storage space of the removable memory device is partitioned. The original data stored in the backup space is totally transferred back to the storage space of the removable memory device after the partitioning of the storage space of the removable memory device is finished.

In one or more embodiments, the storage space of the removable memory device already has an encrypted region and an unencrypted region before the storage space of the removable memory device is partitioned, and the encrypted region and the unencrypted region mutually have a partition ratio in the storage space. Whenever a request for changing the partition ratio into another partition ratio is received, a determination is made as to whether a size of the original data is not greater than a size of the encrypted region which will be changed according to the another partition ratio required in the request.

In one or more embodiments, the step of partitioning the storage space of the removable memory device further includes a step of allocating sizes of the encrypted region and the unencrypted region again according to the another partition ratio required in the request.

In one or more embodiments, the step of partitioning the storage space of the removable memory device further includes a step of partitioning the storage space into an encrypted region and an unencrypted region, and the encrypted region is only accessed with an encryption key password.

In one or more embodiments, the step of totally transferring the original data stored in the backup space back to the storage space, further includes a step of transferring the original data stored in the backup space to the encrypted region and the unencrypted region, respectively.

In one or more embodiments, the method further includes steps as follows. A determination is made as to whether the size of the original data is not greater than the size of the backup space before the storage space of the removable memory device is partitioned. When a determination of the size of the original data not greater than the size of the backup space has been made, a determination is made as to whether the size of the original data is not greater than a size of the unencrypted region. When a determination of the size of the original data not greater than the size of the unencrypted region has been made, the original data is totally transferred to the backup space.

In one or more embodiments, the method further includes steps as follows. The original data stored in the backup space is encrypted after the original data is totally transferred to the backup space. The original data stored in the backup space is decrypted for obtaining the original data from the backup space before the original data is totally transferred back to the storage space.

In one or more embodiments, the method further includes a step as follows. An access path for accessing the backup space is concealed after the original data is totally transferred to the backup space.

In one or more embodiments, the storage space at least has an original encrypted region before the original data is totally transferred to the backup space, and the original data is stored in the original encrypted region, and the original encrypted region is only accessed with an encryption key password.

Another embodiment of the disclosure is to provide a method for partitioning magnetic area of non-volatile memory includes following steps. A removable memory device is connected to a computer device in which a storage space of the removable memory device already has a first encrypted region and a first unencrypted region, and the first encrypted region and the first unencrypted region mutually have a first partition ratio in the storage space. Whenever a request for changing the first partition ratio into a second partition ratio is received, a first data stored in the first unencrypted region is totally transferred to a first backup space located in the computer device, and a second data stored in the first encrypted region is totally transferred to a second backup space located in the computer device. The partition of the storage space of the removable memory device is allocated again according to the second partition ratio so that the storage space of the removable memory device is partitioned into a second encrypted region and a second unencrypted region. The first data stored in the first backup space is totally transferred to the second unencrypted region, and the second data stored in the second backup space is totally transferred to the second encrypted region.

In one or more embodiments, the method further includes steps as follows. A determination is made as to whether the size of the first data is not greater than a size of the second unencrypted region whenever the request is received. When a determination of the size of the first data not greater than the size of the second unencrypted region has been made, the first data is totally transferred to the first backup space.

In one or more embodiments, the method further includes steps as follows. A determination is made as to whether the size of the second data is not greater than a size of the second encrypted region whenever the request is received. When a determination of the size of the second data not greater than the size of the second encrypted region has been made, the first encrypted region is accessed with an encryption key password for obtaining the second data from the first encrypted region, and the second data is totally transferred to the second backup space.

In one or more embodiments, the method further includes further includes steps as follows. A first access path for accessing the first backup space in the computer device is concealed after the first data totally transferred to the first backup space is finished.

In one or more embodiments, the method further includes steps as follows. A second access path for accessing the second backup space in the computer device is concealed after the second data is totally transferred to the second backup space.

In one or more embodiments, the method further includes steps as follows. The first data stored in the first backup space is encrypted after the first data is totally transferred to the first backup space. The first data stored in the first backup space is decrypted for obtaining the first data from the first backup space before the first data is totally transferred to the second unencrypted region.

In one or more embodiments, the method further includes steps as follows. The second data stored in the second backup space is encrypted after the second data is totally transferred to the second backup space. The second data stored in the second backup space is decrypted for obtaining the second data from the second backup space before the second data is totally transferred to the second encrypted region.

Therefore, by the method for partitioning a memory area of a non-volatile memory described in the above embodiments, even if the removable memory device has already contained with data therein before the memory partition method is performed, the original data in the removable memory device still will not be lost so as to improve the usage intention of the user.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
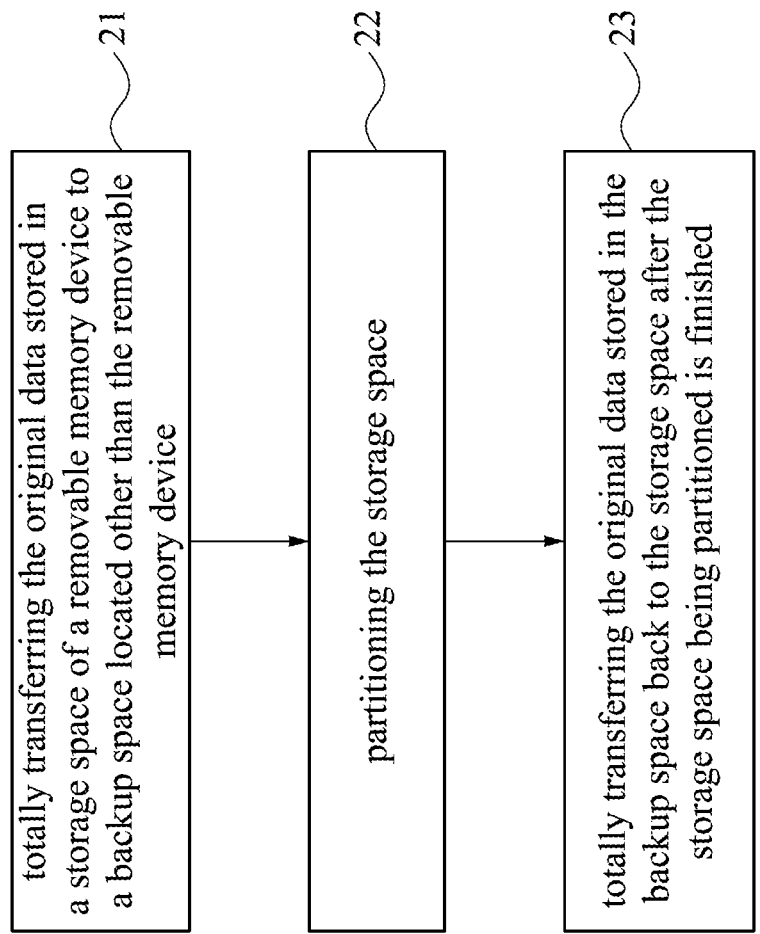
FIG. 1 is a flow chart of a method for partitioning a memory area of a non-volatile memory according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

Reference is now made to FIG. 1, in which FIG. 1 is a flow chart of a method for partitioning a memory area of a non-volatile memory according to one embodiment of the disclosure. Refer to FIG. 1, the method in the embodiment includes steps 21-23 outlined below. In the step 21, original data stored in a storage space of a removable memory device is totally transferred to a backup space which is located in a place other than the removable memory device. In the step 22, the storage space of the removable memory device is partitioned. In the step 23, the original data stored in the backup space is totally transferred back to the storage space of the removable memory device after the storage space of the removable memory device being partitioned is finished.

Therefore, by the method for partitioning a memory area of a non-volatile memory described in the embodiment, even if the removable memory device has already contained with data therein before the memory partition method is performed, the original data in the removable memory device still will not be lost so as to improve the usage intention of the user.

Figure 2:
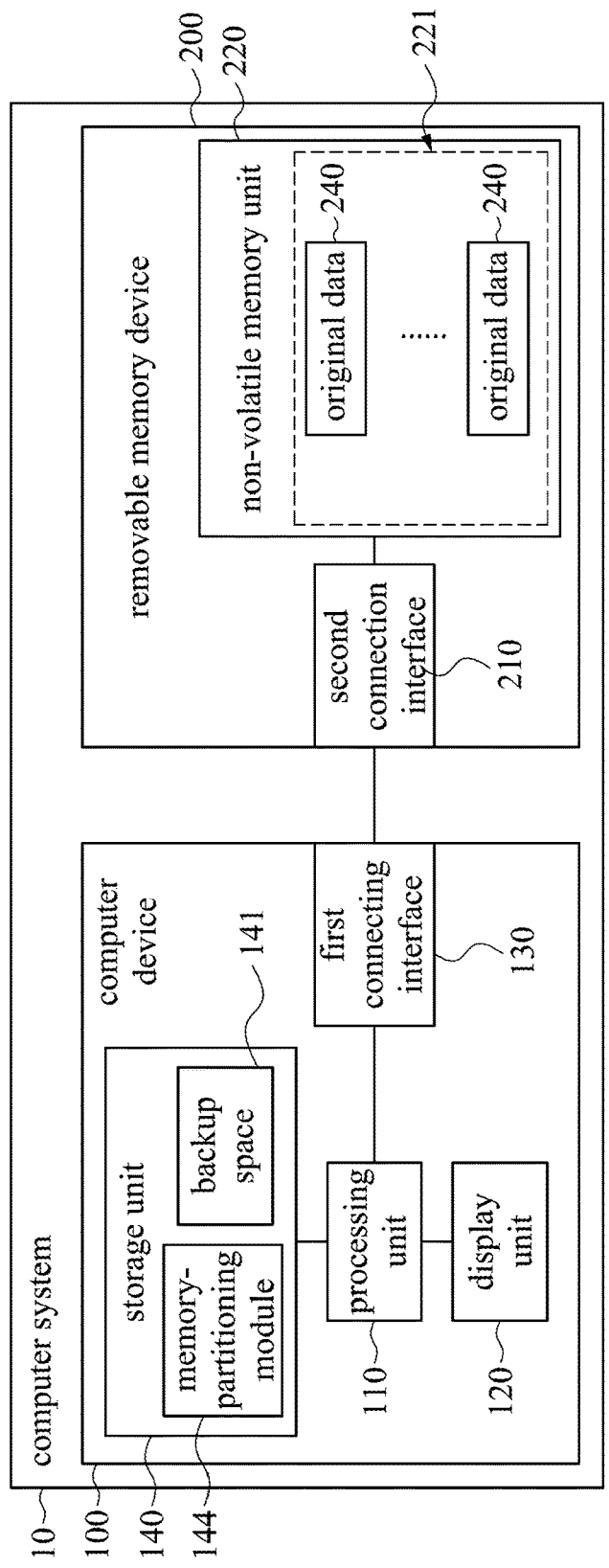
FIG. 2 is a function block diagram of a computer system according to one embodiment of the disclosure.

FIG. 2 is a function block diagram of a computer system 10 according to one embodiment of the disclosure. As shown in FIG. 2, in the embodiment, the computer system 10 includes a computer device 100 and a removable memory device 200. The computer device 100 includes a processing unit 110, a display unit 120, a first connecting interface 130 and a storage unit 140. The processing unit 110 is electrically connected to the display unit 120, the first connecting interface 130 and the storage unit 140. A backup space 141 and a memory-partitioning module 144 are contained in the storage unit 140. However, the disclosure is not limited thereto, for example but not limited thereto, the aforementioned backup space may not be located in the computer device 100, but another position located at other than the removable memory device. The removable memory device 200 includes a second connecting interface 210 and a non-volatile memory unit 220. The non-volatile memory unit 220 is able to store data (called original data hereinafter) therein. The second connecting interface 210 is electrically connected to the non-volatile memory unit 220. The removable memory device 200 is connected to the computer device 100 in a hot-swapping way. Specifically, the removable memory device 200 is electrically connected to the computer device 100 through the second connecting interface 210 removably connected to the first connecting interface 130. The memory-partitioning module 144 is used to partition memory areas of any non-volatile memory unit so that the non-volatile memory unit can be optionally organized to have single one encrypted region only, single one unencrypted region only, or an encrypted region and an unencrypted region which are sized with any particular partition ratio in which the encrypted region can be accessed or opened only with an encryption key password correspondingly matched with the encrypted region, that is, an authority for obtaining the data stored in the encrypted region is granted only with the encryption key password.

It is noted, the original data 240 of the non-volatile memory unit 220 of the removable memory device 200, for example but not limited thereto, is indicated as all of files with any format. In addition, the memory-partitioning module 144 in the present disclosure is not limited to hardware, firmware, or software in the computer device 100.

Figure 3:
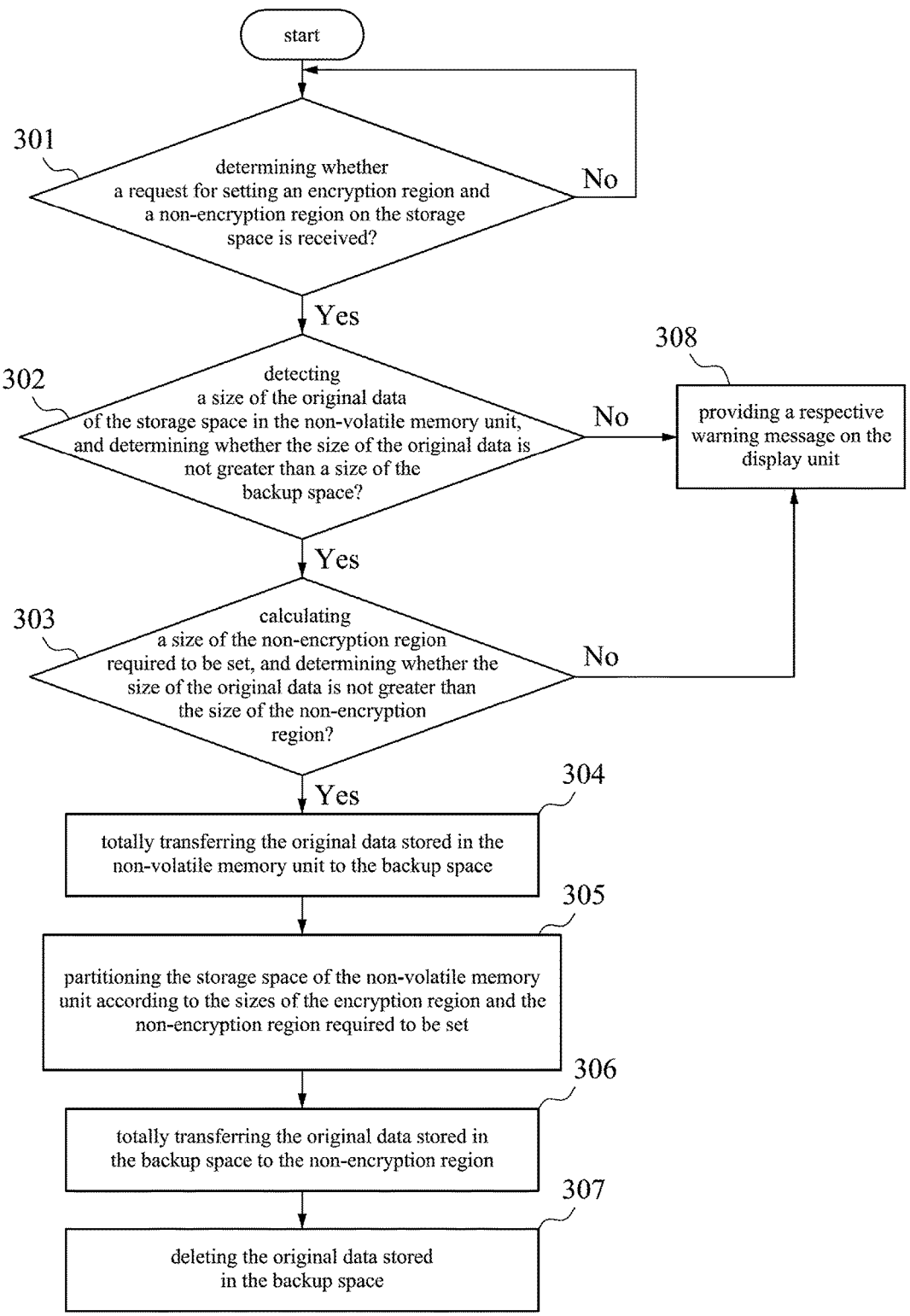
FIG. 3 is a detailed flow chart of the method for partitioning the memory area of the non-volatile memory according to the embodiment of FIG. 1.

FIG. 3 is a detailed flow chart of the method for partitioning the memory area of the non-volatile memory according to the embodiment of FIG. 1. As shown in FIG. 2 and FIG. 3, in the embodiment, the non-volatile memory unit 220 of the removable memory device 200 already has stored the aforementioned original data 240 in the storage space 221 thereof, and the storage space 221 of the non-volatile memory unit 220 of the removable memory device 200 is absent with an encrypted region and a unencrypted region yet. Thus, when the removable memory device 200 is electrically connected to the computer device 100 in a hot-swapping way, and the processing unit 110 receives an instruction for activating the memory-partitioning module 144, the processing unit 110 performs the following steps 301 to 308. In the step 301, a determination is made as to whether a request for setting an encrypted region and an unencrypted region on the storage space 221 is received, if yes, goes to the step 302, otherwise, returns the step 301. In the step 302, a size of the original data 240 of the storage space 221 in the non-volatile memory unit 220 is detected, and a determination is made as to whether the size of the original data 240 is not greater than a size (i.e., capacity) of the backup space 141, if yes, goes to the step 303, otherwise, goes to the step 308. In the step 303, a size (i.e., capacity) of the unencrypted region required to be set in the request above is calculated, and a determination is made as to whether the size of the original data 240 is not greater than the size (i.e., capacity) of the unencrypted region required to be set in the request above, if yes, goes to the step 304, otherwise, goes to the step 308. In the step 304, the original data 240 stored in the non-volatile memory unit 220 is totally transferred (e.g., replicated and moved) to the backup space 141. In the step 305, the storage space 221 of the non-volatile memory unit 220 is partitioned according to the sizes (i.e., capacities) of the encrypted region and the unencrypted region required to be set in the request above. In the step 306, after the storage space 221 is partitioned into the encrypted region and the unencrypted region, the original data 240 stored in the backup space 141 is then totally transferred (e.g., replicated and moved) to the unencrypted region of the non-volatile memory unit 220. In the step 307, the original data 240 stored in the backup space 141 is deleted. In the step 308, a respective warning message is provided on the display unit 120.

More particularly, in the step 302, when the request for setting the encrypted region and the unencrypted region is received, the step 302 further includes a request for respectively setting a size (i.e., capacity) of the encrypted region and a size (i.e., capacity) of the unencrypted region.

In the step 304, after the original data 240 is totally replicated and moved to the backup space 141, the step 302 further includes the original data stored in the backup space is encrypted so that anyone can not directly obtain the original data 240 from the backup space 141 by analyzing the computer device 100. Also, in another embodiment, after the original data 240 is totally transferred (e.g., replicated and moved) to the backup space 141, an access path for accessing the backup space 141 in the storage unit 140 is concealed so that anyone can not directly obtain the original data 240 from the backup space 141 via the aforementioned access path by analyzing the computer device 100.

In the step 305, specifically, before the storage space 221 of the non-volatile memory unit 220 is partitioned into an encrypted region and an unencrypted region which are sized with any particular partition ratio, the step 305 further includes the storage space 221 of the non-volatile memory unit 220 is formatted.

In the steps 306-307, specifically, before the original data 240 stored in the backup space 141 is totally transferred (e.g., replicated and moved) to the unencrypted region, the step 306 further includes the original data 240 stored in the backup space 141 is decrypted for obtaining the original data 240 from the backup space 141. For example but not limited thereto, when an encryption key password is used to decrypt the original data 240 stored in the backup space 141, an authority for obtaining the original data 240, transferring the original data 240 to the backup space 141, and deleting the original data 240 from the backup space 141 is then granted only with the encryption key password.

It is noted, if the backup space 141 is large enough, the step 302 might be omitted in the embodiment because the original data 240 being greater than the backup space 141 might not be happened.

Figure 4:
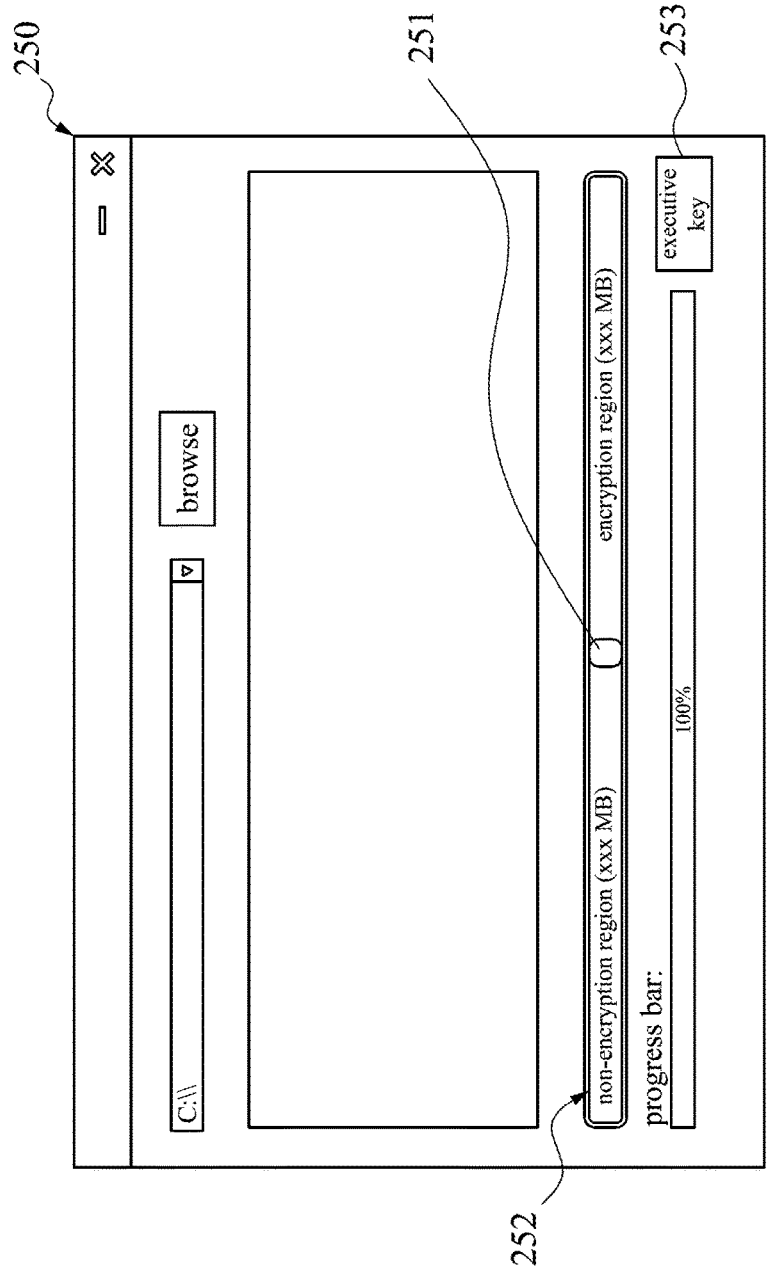
FIG. 4 is a schematic view of an operation interface module of a memory-partitioning module according to the embodiment of FIG. 1.

FIG. 4 is a schematic view of an operation interface module 250 of a memory-partitioning module according to the embodiment of FIG. 1. As shown in FIG. 2 and FIG. 4, in the step 301, specifically, when the processing unit 110 receives an instruction for activating the memory-partitioning module 144, the processing unit 110 provides an operation interface module 250 shown on the display unit 120. The operation interface module 250 is provided with an adjustment portion 251 and a frame (or bar) member 252. A partition ratio of the encrypted region and the unencrypted region in the removable memory device 200 can be adjusted when the adjustment portion 251 is linearly moved in the frame member 252, and an executive key 253 of the operation interface module 250 is pressed. In other words, when a user moves the adjustment portion 251 leftwardly, an instruction for decreasing the size (i.e., capacity) of the unencrypted region and increasing the size (i.e., capacity) of the encrypted region is generated; on the contrary, when a user moves the adjustment portion 251 rightwardly, an instruction for decreasing the size (i.e., capacity) of the encrypted region and increasing the size (i.e., capacity) of the unencrypted region is generated.

Therefore, when the executive key 253 of the operation interface module 250 is pressed, one of the instructions mentioned above is sent to the processing unit 110. Once the processing unit 110 determines that the request for setting the encrypted region and the unencrypted region has been received, the user can dynamically adjust the partition ratio of the encrypted region and the unencrypted region in the removable memory device 200.

Also, when the adjustment portion 251 is linearly moved to a leftmost side or a rightmost side of the frame member 252, the user also can choose to organize the whole storage space 221 of the non-volatile memory unit 220 as single one encrypted region only or single one unencrypted region only.

Figure 5:
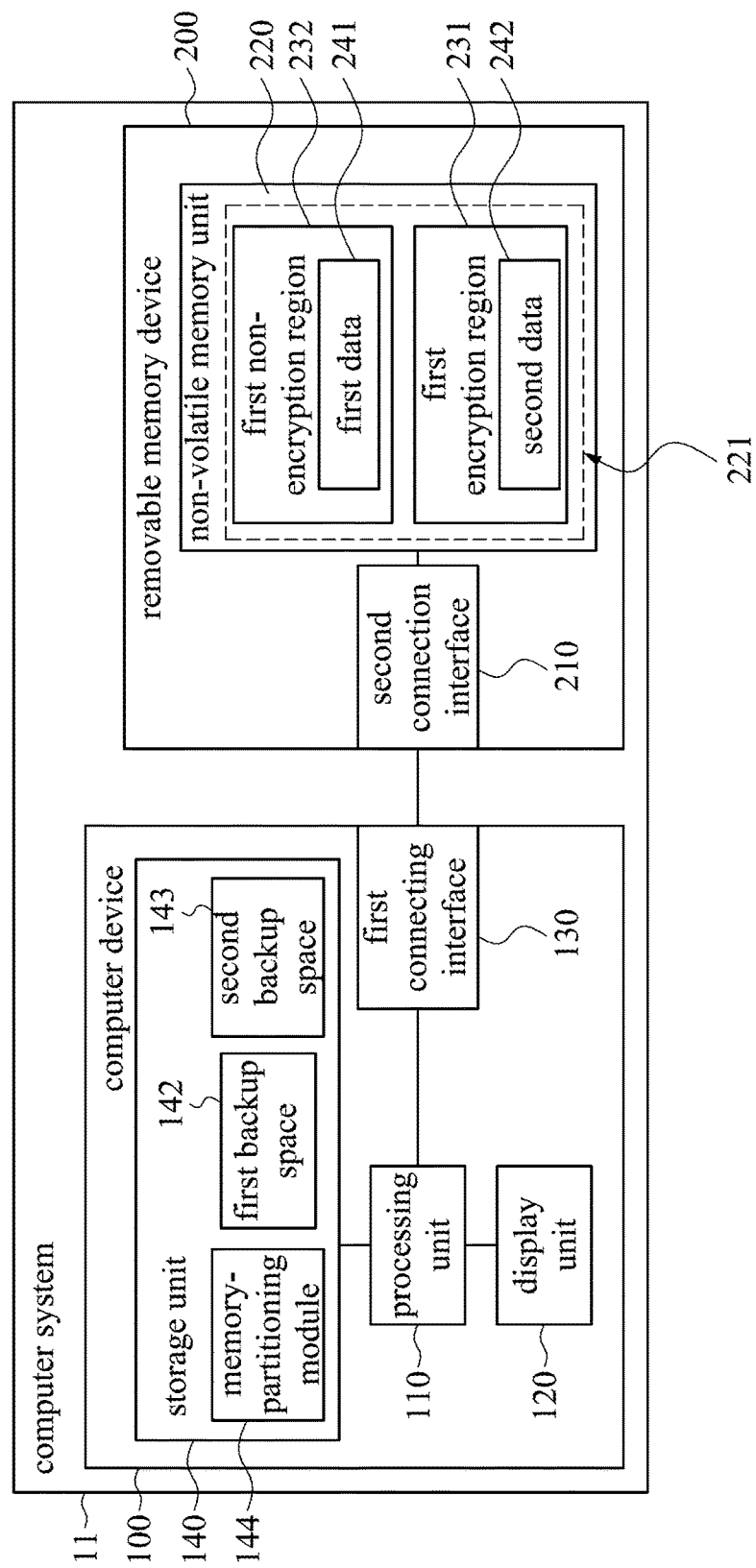
FIG. 5 is a function block diagram of a computer system according to one embodiment of the disclosure.

FIG. 5 is a function block diagram of a computer system 11 according to one embodiment of the disclosure. As shown in FIG. 2 and FIG. 5, the computer system 11 of FIG. 5 is substantially the same as the computer system 10 of FIG. 2, except that the storage unit 140 is provided with a first backup space 142 and a second backup space 143, and the storage space 221 of the non-volatile memory unit 220 of the removable memory device 200 is previously provided with a first encrypted region 231 and a first unencrypted region 232 in which the first encrypted region 231 and the first unencrypted region 232 are inversely proportional to each other, and the first encrypted region 231 and the first unencrypted region 232 mutually have a first partition ratio (or inverse ratio) in the storage space 221, and the first data 241 is already stored in the first unencrypted region 232, and the second data 242 is already stored in the first encrypted region 231.

Figure 6:
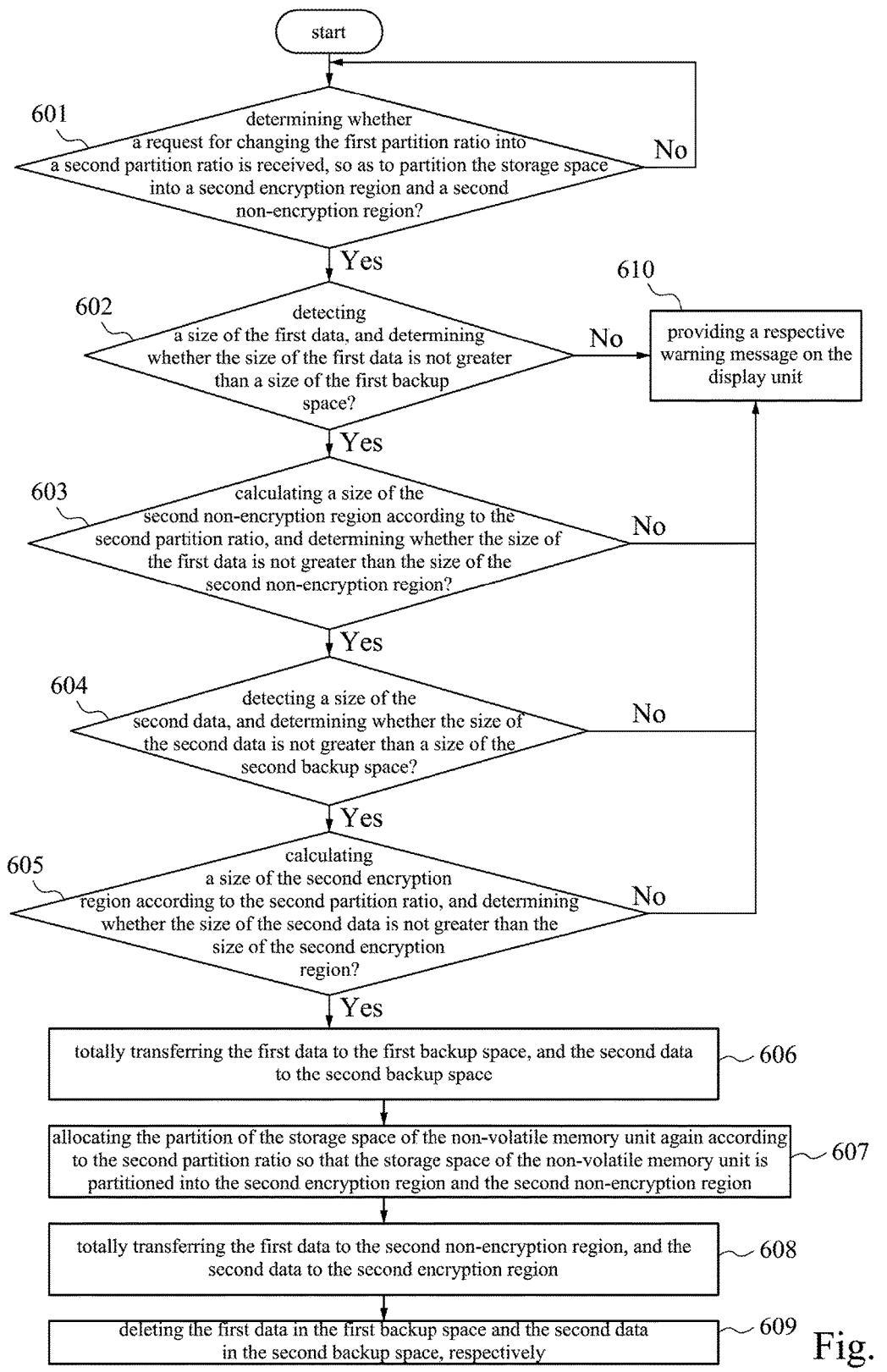
FIG. 6 is a detailed flow chart of a method for partitioning the memory area of the non-volatile memory according to one embodiment.

FIG. 6 is a detailed flow chart of a method for partitioning the memory area of the non-volatile memory according to one embodiment. As shown in FIG. 5 and FIG. 6, in the embodiment, when the removable memory device 200 is electrically connected to the computer device 100 in a hot-swapping way, and the processing unit 110 receives an instruction for activating the memory-partitioning module 144, the processing unit 110 performs the following steps 601 to 610. In the step 601, a determination is made as to whether a request for changing the first partition ratio into a second partition ratio is received, so as to partition the storage space 221 of the non-volatile memory unit 220 into a second encrypted region (not shown in figures) and a second unencrypted region (not shown in figures), if yes, goes to the step 602, otherwise returns to the step 601. In the step 602, a size of the first data 241 is detected, and a determination is made as to whether the size of the first data 241 is not greater than a size (i.e., capacity) of the first backup space 142 of the storage unit 140, if yes, goes to the step 603, otherwise, goes to the step 610. In the step 603, a size (i.e., capacity) of the second unencrypted region is calculated according to the second partition ratio, and a determination is made as to whether the size of the first data 241 is not greater than the size (i.e., capacity) of the second unencrypted region, if yes, goes to the step 604, otherwise, goes to the step 610. In the step 604, a size of the second data 242 is detected, and a determination is made as to whether the size of the second data 242 is not greater than a size (i.e., capacity) of the second backup space 143 of the storage unit 140, if yes, goes to the step 605, otherwise, goes to the step 610. In the step 605, a size (i.e., capacity) of the second encrypted region is calculated according to the second partition ratio, and a determination is made as to whether a size of the second data 242 is not greater than the size (i.e., capacity) of the second encrypted region, if yes, goes to the step 606, otherwise, goes to the step 610. In other words, in the step 605, when a request for changing the first partition ratio into the second partition ratio is determined to be received, a determination is made as to whether a size of the original data (i.e., second data 242) is not greater than the size of the encrypted region (i.e., second encrypted region) which is going to be changed according to the second partition ratio required in the request. In the step 606, the first data 241 stored in the storage space 221 is totally transferred (e.g., replicated and moved) to the first backup space 142, and the second data 242 stored in the storage space 221 is totally transferred (e.g., replicated and moved) to the second backup space 143. In the step 607, the partition of the storage space 221 of the non-volatile memory unit 220 is allocated again according to the second partition ratio so that the storage space 221 of the non-volatile memory unit 220 is partitioned into a second encrypted region and a second unencrypted region. In the step 608, after the second encrypted region and the second unencrypted region being partitioned are finished, the first data 241 stored in the first backup space 142 is totally transferred (e.g., replicated and moved) to the second unencrypted region, and the second data 242 stored in the second backup space 143 is totally transferred (e.g., replicated and moved) to the second encrypted region. In the step 609, the first data 241 stored in the first backup space 142 and the second data 242 stored in the second backup space 143 are deleted, respectively. In the step 610, a respective warning message is provided on the display unit 120.

Specifically, in the step 601, the request for changing the first partition ratio into the second partition ratio also can be sent by using the operation interface module 250 illustrated in FIG. 4 so as to dynamically adjust the partition ratio of the encrypted region and the unencrypted region in the removable memory device 200. As detailed above, how the operation interface module 250 is operated will not be described here.

In the step 606, after the first data 241 is totally transferred (e.g., replicated and moved) to the first backup space 142, the step 606 further includes that the first data 241 stored in the first backup space 142 is encrypted so that anyone can not directly obtain the first data 241 from the first backup space 142 by analyzing the computer device 100. Also, in another embodiment, after the first data 241 is totally transferred (e.g., replicated and moved) to the first backup space 142, an access path for accessing the first backup space 142 in the storage unit 140 is concealed so that anyone can not directly obtain the first data 241 from the first backup space 142 via the aforementioned access path by analyzing the computer device 100.

In the step 606, when a determination is made as to whether the size of the second data 242 not greater than the size (i.e., capacity) of the second encrypted region, the step 606 further includes that the second data 242 in the first encrypted region 231 is authorized to be totally transferred (e.g., replicated and moved) to the second backup space 143 by accessing the first encrypted region 231 with an encryption key password. Furthermore, after the second data 242 is totally transferred (e.g., replicated and moved) to the second backup space 143, the step 606 further includes that the second data 242 stored in the second backup space 143 is encrypted so that anyone can not directly obtain the second data 242 from the second backup space 143 by analyzing the computer device 100. Also, in another embodiment, after the second data 242 is totally transferred (e.g., replicated and moved) to the second backup space 143, the step 606 further includes that an access path for accessing the second backup space 143 in the storage unit 140 is concealed so that anyone can not directly obtain the second data 242 from the second backup space 143 via the aforementioned access path by analyzing the computer device 100.

In the step 607, specifically, before the storage space 221 of the non-volatile memory unit 220 is partitioned into a second encrypted region and a second unencrypted region, the step 607 further includes that the storage space 221 of the non-volatile memory unit 220 is formatted.

In the steps 608-609, specifically, before the first data 241 stored in the first backup space 142 is totally transferred (e.g., replicated and moved) to the second unencrypted region, the step 608-609 further includes the first data 241 stored in the first backup space 142 is decrypted for obtaining the first data 241 from the first backup space 142. For example but not limited thereto, when an encryption key password is used to decrypt the first data 241 stored in the first backup space 142, an authority for obtaining the first data 241, transferring the first data 241 to the first backup space 142, and deleting the first data 241 from the first backup space 142 is then granted only with the encryption key password. Similarly, before the second data 242 stored in the second backup space 143 is totally transferred (e.g., replicated and moved) to the second encrypted region, the step 608-609 further includes the second data 242 stored in the second backup space 143 is decrypted for obtaining the second data 242 from the second backup space 143. For example but not limited thereto, when an encryption key password is used to decrypt the second data 242 stored in the second backup space 143, an authority for obtaining the second data 242, transferring the second data 242 to the second backup space 143, and deleting the second data 242 from the second backup space 143 is then granted only with the encryption key password.

It is noted, in another embodiment, the present disclosure is not limited the order of the steps 602 to 605 either; or, in other embodiments, if the first backup space 142 and the second backup space 143 are respectively large enough, the method of the embodiment may also omit steps 602 and 604.

In the above embodiments, for example but not limited thereto, the removable memory device 200 is, for example but not limited thereto, a USB removable memory device, a smart electronic device, a memory card, an external hard disk, or the like, in which the intelligent electronic device may be, for example but not limited thereto, a smartphone or a tablet computer; the processing unit 110 is, for example but not limited thereto, a central processing unit or the like; the first connection interface 130 and the second connection interface 210 are, for example but not limited thereto, a USB connection interface or the like; a storage unit 140 Such as a hard disk device or the like; the non-volatile memory unit 220 is, for example but not limited thereto, a flash memory or the like.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for partitioning memory area of non-volatile memory, comprising:
   totally transferring original data stored in a storage space of a removable memory device to a backup space located in a place other than the removable memory device;
   partitioning the storage space of the removable memory device;
   totally transferring the original data stored in the backup space back to the storage space of the removable memory device after the storage space of the removable memory device being partitioned is finished; and
   concealing an access path for accessing the backup space after the original data is totally transferred to the backup space,
   wherein the storage space of the removable memory device already has an encrypted region and an unencrypted region before the storage space of the removable memory device is partitioned, and the encrypted region and the unencrypted region mutually have a partition ratio in the storage space; and
   whenever a request for changing the partition ratio into another partition ratio is received, determining whether a size of the original data is not greater than a size of the encrypted region which will be changed according to the another partition ratio required in the request;
   wherein the step of partitioning the storage space of the removable memory device further comprises:
   allocating sizes of the encrypted region and the unencrypted region again according to the another partition ratio required in the request.

2. The method for partitioning memory area of non-volatile memory of claim 1, wherein the step of partitioning the storage space of the removable memory device further comprises:
   partitioning the storage space into an encrypted region and an unencrypted region, wherein the encrypted region is only accessed with an encryption key password;
   wherein the step of totally transferring the original data stored in the backup space back to the storage space, further comprises:
   transferring the original data stored in the backup space to the encrypted region and the unencrypted region, respectively.

3. The method for partitioning memory area of non-volatile memory of claim 1, further comprising:
   determining whether a size of the original data is not greater than a size of the backup space before the storage space of the removable memory device is partitioned;
   when a determination of the size of the original data not greater than the size of the backup space is made, determining whether the size of the original data is not greater than a size of the unencrypted region; and
   when a determination of the size of the original data not greater than the size of the unencrypted region is made, totally transferring the original data to the backup space.

4. The method for partitioning memory area of non-volatile memory of claim 1, further comprising:
   encrypting the original data stored in the backup space after the original data is totally transferred to the backup space; and
   decrypting the original data stored in the backup space for obtaining the original data from the backup space before the original data is totally transferred back to the storage space.

5. The method for partitioning memory area of non-volatile memory of claim 1, wherein before the original data is totally transferred to the backup space, the storage space has an original encrypted region, wherein the original data is stored in the original encrypted region, and the original encrypted region is only accessed with an encryption key password.

6. A method for partitioning memory area of non-volatile memory, comprising:
   connecting a removable memory device to a computer device, wherein a storage space of the removable memory device already has a first encrypted region and a first unencrypted region, and the first encrypted region and the first unencrypted region mutually have a first partition ratio in the storage space;

whenever a request for changing the first partition ratio into a second partition ratio is received, totally transferring a first data stored in the first unencrypted region to a first backup space located in the computer device, and totally transferring a second data stored in the first encrypted region to a second backup space located in the computer device;

allocating the partition of the storage space of the removable memory device again according to the second partition ratio so that the storage space of the removable memory device is partitioned into a second encrypted region and a second unencrypted region; and totally transferring the first data stored in the first backup space to the second unencrypted region, and totally transferring the second data stored in the second backup space to the second encrypted region;

whenever the request is received, determining whether a size of the first data is not greater than a size of the second unencrypted region; and when a determination of the size of the first data not greater than the size of the second unencrypted region is made, totally transferring the first data to the first backup space; and whenever the request is received, determining whether a size of the second data is not greater than a size of the second encrypted region;

when a determination of the size of the second data not greater than the size of the second encrypted region is made, accessing the first encrypted region with an encryption key password for obtaining the second data from the first encrypted region, and totally transferring the second data to the second backup space;

concealing a first access path for accessing the first backup space in the computer device after the first data totally transferred to the first backup space is finished; and concealing a second access path for accessing the second backup space in the computer device after the second data is totally transferred to the second backup space.

7. The method for partitioning memory area of non-volatile memory of claim 6, further comprising:

encrypting the first data stored in the first backup space after the first data is totally transferred to the first backup space; and decrypting the first data stored in the first backup space for obtaining the first data from the first backup space before the first data is totally transferred to the second unencrypted region; and encrypting the second data stored in the second backup space after the second data is totally transferred to the second backup space; and decrypting the second data stored in the second backup space for obtaining the second data from the second backup space before the second data is totally transferred to the second encrypted region.

* * * * *